UNITED STATES PATENT OFFICE.

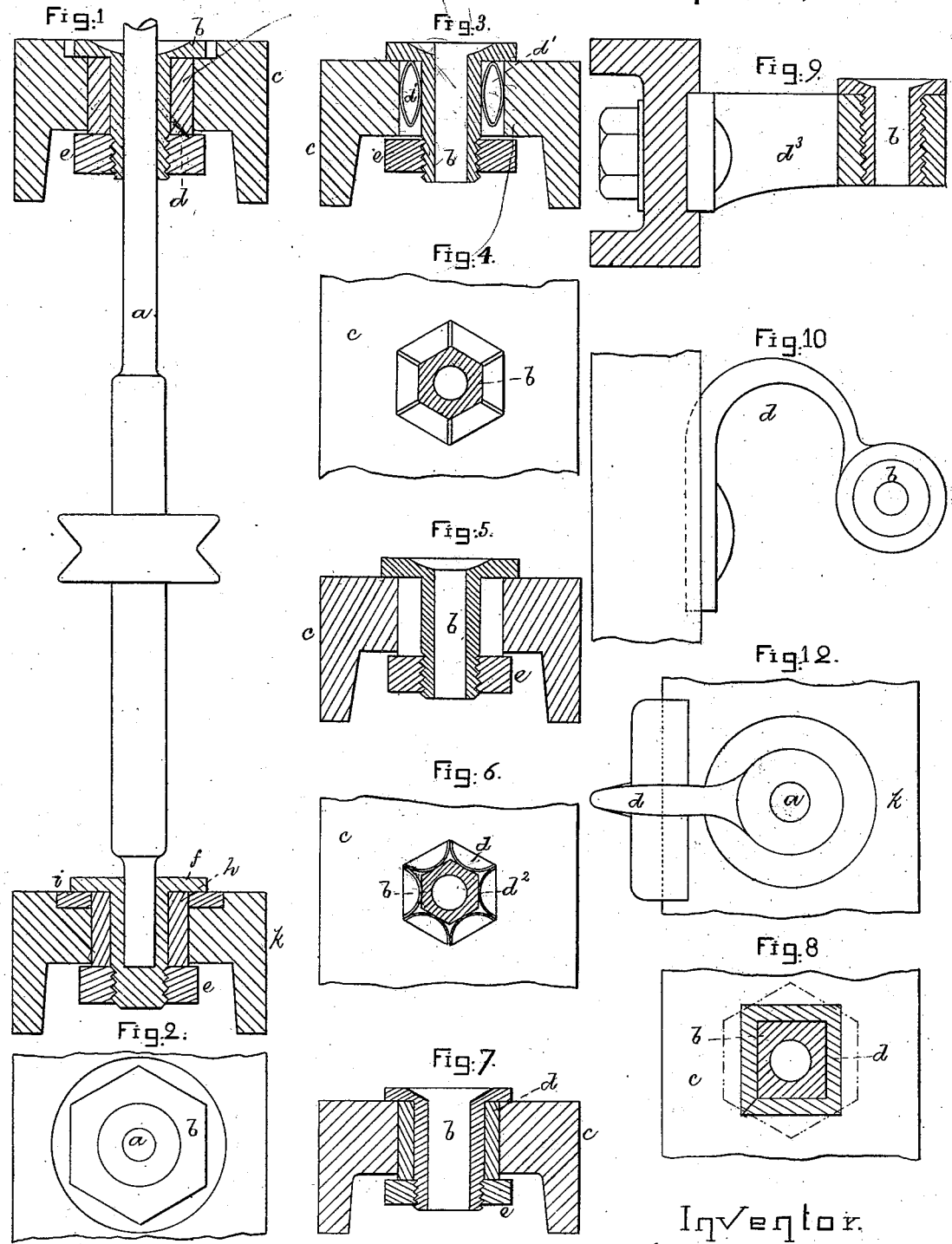

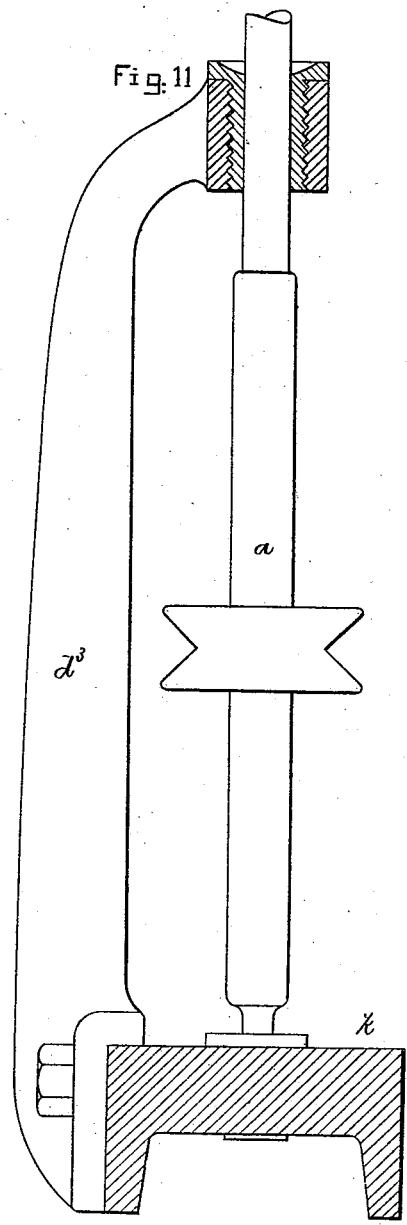

JOHN SMITH RAWORTH, OF MANCHESTER, ENGLAND, ASSIGNOR TO WILLIAM F. DRAPER, OF HOPEDALE, MASSACHUSETTS.

BEARING FOR SPINNING-SPINDLES.

SPECIFICATION forming part of Letters Patent No. 226,789, dated April 20, 1880.

Application filed January 8, 1879. Patented in England August 5, 1874.

*To all whom it may concern:*

Be it known that I, JOHN SMITH RAWORTH, of Exchange Buildings, Manchester, England, have invented new and useful Improvements in Bearings for Spinning-Spindles, which invention is fully set forth in the following specification and drawings.

My improvements in machines for spinning and doubling fibrous materials relate chiefly to the lateral bearings for the spindles of mules, twiners, throstles, doubling-frames, and all machines for spinning, throwing, or twisting cotton, silk, wool, linen, or other yarns in which spindles are employed, revolving at a high rate of speed, and to the means for supporting the said lateral bearings which come in contact with the spindle-body between its ends.

The object of the invention is the attainment of higher speeds with greater steadiness, and a consequent diminution of wear and tear, noise, and turning power.

In carrying this my invention into practice I so sustain the external portions of the entire bearings, the step-bearing included, which embrace and guide the spindle externally or laterally, that the spindle from its extreme lower end upward, as far as operated upon by its bearings, is free to move with the said bearings in any and all radial directions from the center of the spindle against a yielding pressure, whereby the bearings are permitted to adapt themselves to any and all irregular or eccentric motions of the spindle, and the latter is enabled to assume a position in accordance with the center of gravity of the spindle and bobbin and there rotate steadily, which operation is productive of advantages, as above stated.

When the bearings are rigidly fixed any eccentricity of motion or rotation of the spindle is aggravated with increase of speed. When only the upper bearing or bolster of a spindle is held with a certain degree of elasticity the vibration and jar of the spindle limit its speed of rotation, the quality and evenness of the yarn are much impaired, and a spindle so held has little, if any, merit over one held rigidly in two bearings.

I have found in practice that to reduce the vibrations of the spindle to a minimum all the bearings, including the step-bearings, which come against the lower end and sides of the spindle, must be free to move in any and all directions radially within certain limits from the center of rotation of the spindle.

I am aware that it is not new in spinning machinery to permit the lower bearing to yield in two directions only—as, for instance, directly toward and from the drum which actuates the usual bands for driving the spindles.

In this my invention I have shown several ways or plans of holding all the bearing-surfaces for each spindle, so that when moved by the spindle during its rotation the bearings will act against a yielding pressure inherent in the material used to surround the external portions of the bearings.

By my invention the spindle and bobbin are permitted to revolve around their combined or common center of gravity, instead of about the center of rotation of the spindle, as in the old way. Owing to the bobbin becoming warped and being unequally loaded, the center of gravity of the spindle and bobbin seldom, if ever, coincide.

This invention is applicable not only to common bolsters, but also to such as are elongated into a tube to surround that portion of the spindle within the bolster—for instance, as illustrated in Gore's doubling-frames, which are well known to the trade.

The elastic supports external to the bearings may be composed of different materials, and be embodied in different forms.

Figure 1 represents, in section, a bolster and step-rail, spindle-bearings, and elastic external supports, a spindle being shown therein in elevation; Fig. 2, a top view of Fig. 1; and the remaining figures of the drawings illustrate modifications of my invention, which will be hereinafter referred to.

In Fig. 1, $a$ is the spindle; $b$, the bolster or upper bearing; $c$, the bolster or upper rail; $d$, the elastic support external to the bolster or upper bearing, $b$. The lower bearing, $f$, is surrounded externally by the elastic support $h$, set into the lower rail, $k$.

The bearings $b$ and $f$ are placed in enlarged openings made in the rails $c$ $k$, and are surrounded by the elastic supporting mediums $d$ $h$, which are in said figures represented as pieces of india-rubber packing; but they may be pieces of leather, or compound cork, or soft wood, or similar substances. The bearings are held from rising by means of the nuts $e$. The flanged upper ends of the bearings may rest on pieces of rubber or other elastic packing, as at $i$.

In Figs. 3 and 4 I have shown a vertical and horizontal section of a bolster-bearing made hexagonal externally and fitted into a hexagonal hole in the rail, and instead of india-rubber I have inserted between the bearing and the rail elastic supports, which are shown as elliptical springs $d'$. This hexagonal form given to the bolster-bearing prevents it from turning, and may be used with the india-rubber packing, and, instead of hexagonal, may be square, as shown in Figs. 7 and 8, or may be elliptical.

In Figs. 5 and 6 I have shown crescent-shaped springs $d^2$, of metal, having their backs pressed against the bolster and their ends against the spindle-rail.

In Figs. 7 and 8 I have shown the elastic support as a piece of packing.

Figs. 9 and 10 represent, in vertical section and top plan, a modification, in which the elastic support for the bolster-bearing is shown as a spring-metal arm, $d^3$, so constructed, as shown, as to be free to yield radially in any direction to the bolster and spindle.

In Figs. 11 and 12 I have shown the spring-arm $d^3$, which carries the bolster as connected with the lower rail, $k$, so as to yield freely in every direction radially.

I claim—

1. In a spinning-machine, a rotating spindle and all its lateral bearings, including the step-bearing, combined with elastic or yielding supports external to the bearings, and holding surfaces or rails outside of the elastic supports, the supports being adapted to permit the spindle and all its lateral bearings to move radially in any direction from the center of rotation of the spindle, substantially as and for the purposes set forth.

2. In a spinning-machine, a bearing for the extreme lower portion of the spindle and a collar or flange thereon to extend over the rail about the bearing-receiving opening made through the rail, combined with the rail, a nut or fastening for the bearing, and an elastic or yielding packing interposed between the flange and nut at one side of the rail to hold the bearing in a yielding manner, substantially as and for the purpose described.

In testimony whereof I have signed this specification in the presence of two subscribing witnesses this 10th day of December, A. D. 1878.

JOHN SMITH RAWORTH. [L. S.]

In presence of—
    ARTHUR C. HALL,
      *U. S. Consular Clerk, Manchester, England.*
    WM. MORGAN BROWN,
      38 *Southampton Buildings, London.*